United States Patent [19]

Sien

[11] 3,886,738
[45] June 3, 1975

[54] DIESEL ENGINE FOR USE IN MINES

[75] Inventor: Gerald Bruce Sien, Carlsbad, N. Mex.

[73] Assignee: Sien Equipment Company, Carlsbad, N. Mex.

[22] Filed: Apr. 23, 1973

[21] Appl. No.: 353,519

[52] U.S. Cl. .............. 60/277; 60/310; 123/142
[51] Int. Cl. ............................................. F02b 75/10
[58] Field of Search ........ 60/310, 277, 321; 123/142

[56] References Cited
UNITED STATES PATENTS

| | | | |
|---|---|---|---|
| 1,262,317 | 4/1918 | Finney | 123/142 |
| 2,275,634 | 3/1942 | Leipert | 60/321 |
| 2,790,506 | 4/1957 | Vactor | 60/277 |
| 2,849,295 | 8/1958 | Ruth | 60/310 |
| 2,911,289 | 11/1959 | Forry | 60/310 |
| 3,132,474 | 5/1964 | Fox | 60/310 |
| 3,263,413 | 8/1966 | Vactor | 60/277 |
| 3,459,444 | 8/1969 | Rofe | 285/226 |
| 3,695,005 | 10/1972 | Yuzawa | 60/310 |

Primary Examiner—Douglas Hart
Attorney, Agent, or Firm—Richards, Harris & Medlock

[57] ABSTRACT

A diesel engine for use in mines comprises an intake system including an air filter, an intake flame arrester, an emergency air cut-off valve, and an intake manifold. An exhaust system for the engine includes a liquid cooled exhaust manifold, apparatus for injecting a water spray into the exhaust gases flowing from the manifold and thereby cooling the exhaust gases, and a scrubber which functions as an exhaust flame arrester, as an exhaust gas diluter, to remove certain contaminates from the exhaust gases, and to further cool the exhaust gases. The engine further includes a control system which functions to terminate operation of the engine in the event of either excessive temperature in the cooling system of the engine, excessive temperature in the exhaust system of the engine, insufficient pressure in the lubrication system of the engine, or an inadequate water level in the scrubber of the exhaust system.

12 Claims, 11 Drawing Figures

DIESEL ENGINE FOR USE IN MINES

BACKGROUND AND SUMMARY OF THE INVENTION

This invention relates to a diesel engine for use in mines and similar potentially flamable and/or inadequately ventilated environments, and more particularly to a diesel engine suitable for use as the prime mover in mine vehicles intended for use in coal mines and in gassy metallic and non-metallic mines.

As is well known, the atmosphere in mines, tunnels, and the like often contains substantial quantities of highly flamable gases, particularly methane, Certain types of mining operations, particularly coal mining operations, are also known to produce highly flamable dusts, i.e., coal dust. These factors, together with the constant problem of providing adequate ventilation have heretofore substantially prohibited the use of internal combustion engines in mines and similar environments.

There are a number of factors which have heretofore contributed to the unsatisfactory characteristics of internal combustion engines insofar as mine usage is concerned. Thus, such engines are often prone to emit sparks, which may be caused by operation of the starter system of the engine, backfiring through the intake manifold and associated apparatus, sparks emitted with the exhaust of the engine, etc. Another factor involves the fact that since the operating temperature within such an engine may exceed 1200°F, various surfaces of the engine may become heated to extremely high temperatures. Either of these situations can cause a fire or explosion in the event that the atmosphere surrounding the engine contains sufficient quantities of flamable gases, or in the event that coal dust or similar materials are present.

Still another factor which has heretofore prevented the use of internal combustion engines in mines involves the fact that most engines intended for conventional usage are not provided with adequate monitoring systems to prevent unsatisfactory operation of the engine. It will be appreciated that in the case of a mine vehicle, such conditions can lead not only to a situation which might cause a fire or explosion within the mine, but perhaps more importantly can cause the vehicle to operate under such conditions that the engine emits highly dangerous exhaust gases. In many instances, such gases simply cannot be compensated for by the ventilation system of the mine.

The present invention relates to a deisel engine which overcomes the foregoing problems and is therefore adapted for use in mines and similar applications which may be potentially flamable and/or which may have restricted ventilation. In accordance with the broader aspects of the invention, structure is provided for preventing any surface of the engine from exceeding 300° F. Moreover, apparatus is provided for completely containing any sparks, flames, or explosions occurring during operation of the engine. Finally, literally every operating parameter of the engine is constantly monitored, and structure is provided for immediately terminating operation of the engine should any of the monitored parameters exceed predetermined limits. By this means there is provided an engine which is adapted for completely safe operation within environments which have heretofore been prohibited to the use of internal combustion engines.

In accordance with more specific aspects of the invention, the intake system of the engine is provided with an air cleaner and an intake flame arrester adapted to prevent flames or sparks caused by backfiring of the engine from escaping therefrom into the atmosphere surrounding the engine. The intake system is further provided with an emergency shut-down valve capable of terminating all intake air flow to the engine. The latter apparatus is utilized as in emergency shut-down only, but is considered necessary in the event that the methane content of the atmosphere surrounding the engine should reach a sufficient level to provide a fuel for the engine.

Exhaust gases from the engine are received in a liquid-cooled exhaust manifold. A water spray is injected into the gases passing out of the exhaust manifold, whereby the exhaust gases are substantially cooled. The exhaust gases and the entrained water vapor are then directed through a water-filled scrubber which functions as an exhaust flame arrester, as an exhaust gas cooler, as an exhaust gas diluter, and to remove various contaminates from the exhaust gases. Exhaust gases passing out of the scrubber are directed to a horizontally disposed diffuser, whereby the substantially cooled gases are blended with the atmosphere.

In accordance with still other aspects of the invention, the engine is adapted for starting by means of a pneumatic starter. This is to eliminate a potential sparking problem which exists in the use of an electrically driven starter. The starter is actuated by compressed air which is supplied by means of an air compressor driven by the engine. Compressed air is also utilized to actuate a pneumatic control apparatus serving to govern the various operations of the engine, thereby further reducing potential spark hazards.

As has been indicated, the diesel engine incorporating the present invention is provided with numerous control systems which combine to provide substantially complete monitoring of the various functions of the engine. For example, the engine is equipped with such conventional control apparatus as oil pressure and water temperature gauges. However, rather than merely providing an indication of an abnormal condition in these parameters, the present invention includes means for terminating operation of the engine in the event that the normal operating limits of these parameters are exceeded. The engine further includes various additional transducers for monitoring operating parameters of the engine which are not normally monitored. These include the temperature of the exhaust gases passing out of the exhaust manifold and lack of sufficient water in the scrubber to perform the exhaust flame arrester function thereof. Both of these monitoring systems are further adapted to terminate operation of the engine in the event that the operating limits associated with the particular parameter are exceeded.

DESCRIPTION OF THE DRAWINGS

A more complete understanding of the invention may be had by referring to the following Detailed Description when taken in conjunction with the accompanying Drawings, wherein.

DETAILED DESCRIPTION

Figure 1:
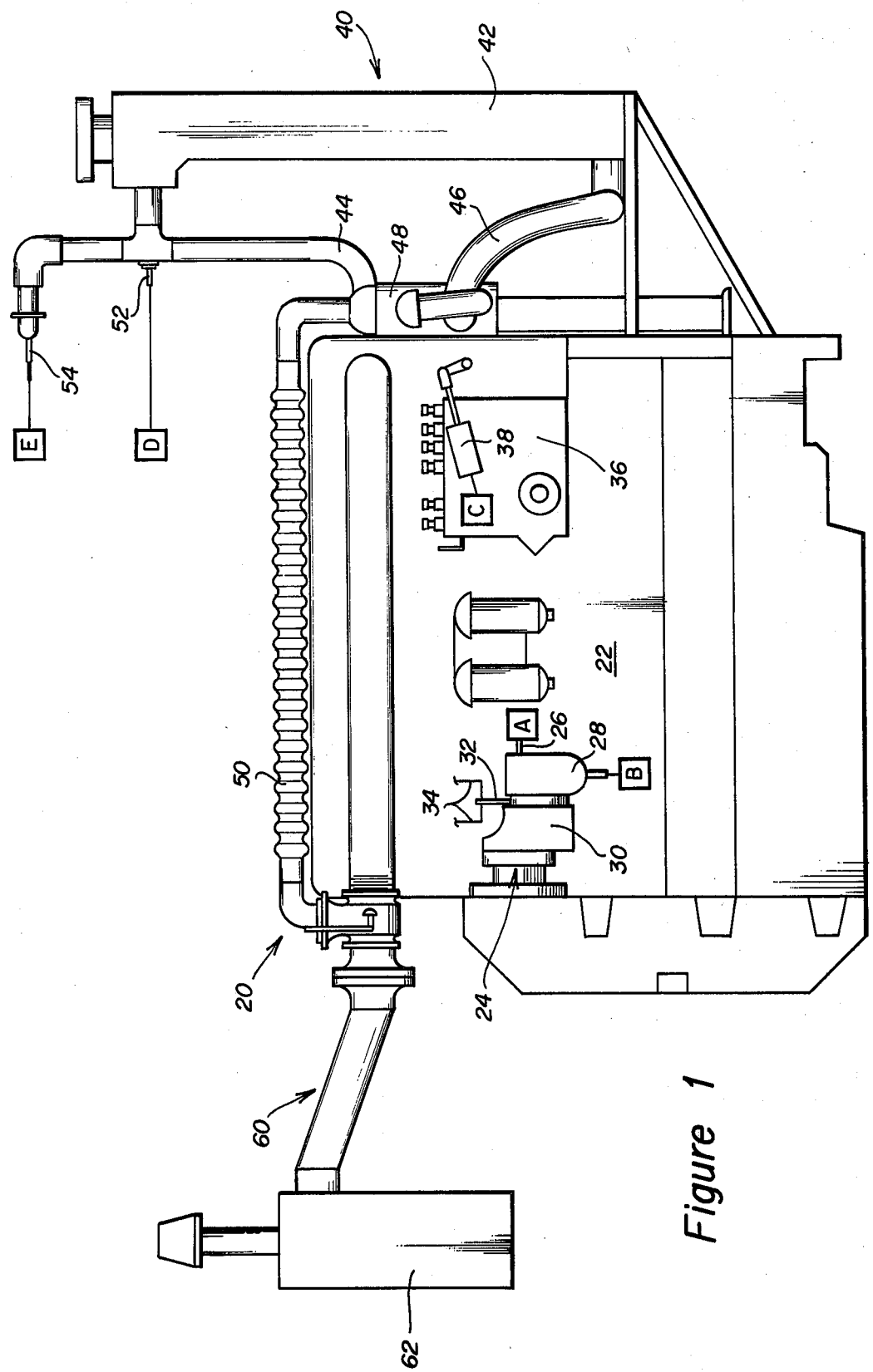
FIG. 1 is a right side view of a diesel engine incorporating the invention.

Referring now to the Drawings, there is shown a diesel engine 20 incorporating the invention. Throughout the Drawings, interconnections between various component parts and subsystems of the engine 20 are illustrated by means of square boxes each including a reference letter. It will be understood that the use of square boxes containing identical reference letters in two or more views of the Drawings comprises an indication of a direct interconnection between electrical leads, pneumatic conduits, and/or water lines appearing in those views.

Referring particularly to FIG. 1, the engine 20 comprises an engine block 22 defining a plurality of cylinders. A piston is mounted for reciprocation within each cylinder to compress and ultimately to cause combustion of a fuel/air mixture received in the cylinder. The engine 20 further comprises conventional valves and fuel injectors for controlling the flow of air and fuel into the cylinders and for controlling the flow of exhaust gases out of the cylinders.

The diesel engine 20 is provided with a pneumatic starter system 24. The starter system 24 is actuated by compressed air received through a line 26. A valve 28 functions to control the flow of compressed air from the line 26 to a pneumatic starter motor 30. The valve 28 is a pneumatic solenoid or pilot actuated valve. The starter system 24 further includes a diesel lubricator 32 including lines 34 extending to and from a diesel fuel tank (not shown) associated with the engine 20. The lubricator 32 functions to entrain oil in the compressed air flowing to the starter motor 30, thereby lubricating and sealing the component parts of the motor.

The diesel engine 20 is provided with a fuel injector system 36 which functions to control the flow of diesel fuel from the diesel fuel supply tank into the cylinders of the engine. The injector system 36 includes an emergency shut-down slave cylinder 38. Upon actuation, the cylinder 38 functions to terminate all fuel flow to the engine, whereby operation of the engine 20 is immediately terminated. The cylinder 38 is spring biased toward condition wherein operation of the engine is prevented, and is normally maintained in the opposite condition by means of compressed air.

A cooling system 40 for the diesel engine 20 is also illustrated in FIG. 1. The cooling system 40 includes a radiator 42 which receives heated liquid through a line 44. The liquid is cooled in the radiator 42 and is returned to the engine block 22 by means of a line 46 and a pump 48 which is driven by the engine. Heated liquid flowing from the engine block 22 is directed to an exhaust manifold (not shown in FIG. 1) by means of a line 50.

Liquid flowing from the exhaust manifold is returned to the radiator 42 of the cooling system 40 through the line 44. The line 44 includes two probes 52 and 54, both of which function to sense the temperature of the heated liquid. The probe 52 functions to actuate a conventional temperature gauge, and the probe 54 functions through the control system of the engine to immediately terminate operation of the engine in the event the heated liquid exceeds a predetermined temperature, typically about 250° F.

Figure 3:
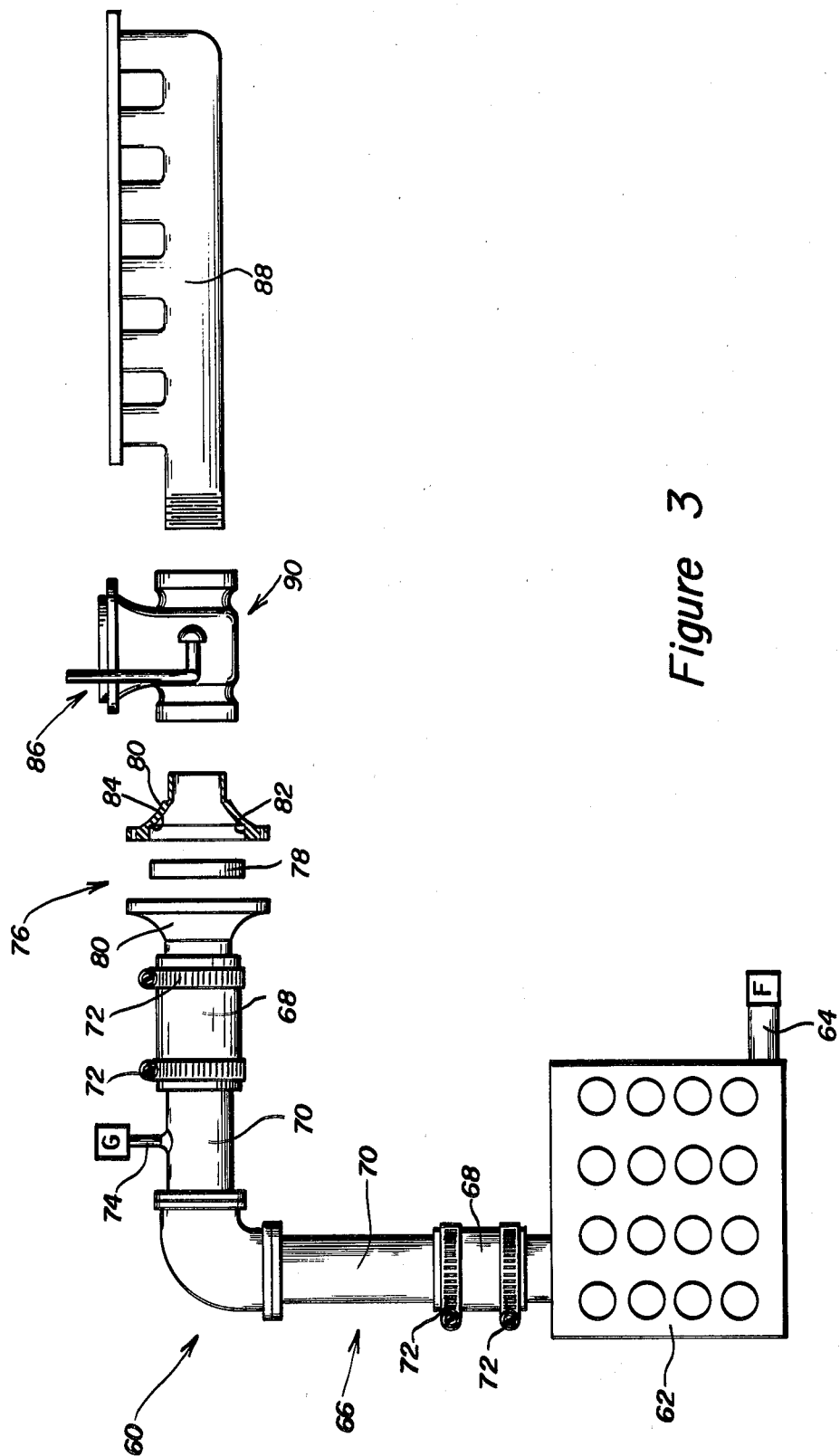
FIG. 3 is an exploded view of the intake system of the engine.

Combustion air is received in the cylinders of the diesel engine 20 by means of an intake system 60. As is best shown in FIGS. 1 and 3, the intake system 60 includes an air cleaner 62 comprising an aspirator outlet 64. By means of the aspirator outlet, larger particulate particles are withdrawn from the air flowing through the air cleaner 62 and are discharged from the engine 20 together with the exhaust gases flowing therefrom.

Air flowing from the air cleaner 62 is directed through a conduit 66 which may include relatively flexible sections 68 secured to relatively rigid sections 70 by means of conventional clamps 72. The conduit 66 may include a tap 74 comprising the inlet for the pneumatic system of the engine 20. By this means the pneumatic system receives only filtered air, whereby the service life of the component parts of the pneumatic system is considerably lengthened.

The conduit 66 functions to direct intake air from the air cleaner 62 to an intake flame arrester 76 which functions in the event of a backfire, etc. to prevent sparks and flames from reaching the atmosphere surrounding the diesel engine 20. The operating component of the intake flame arrester 76 comprises a flame arrester disk 78 of the type manufactured by the G. W. Lisk Company under Model Number L-3602. The flame arrester disk 78 is received in a pair of opposed flame arrester bells 80 each having a flame arrester disk receiving cavity 82 machined therein.

The cavities 82 of the bells 80 cooperate to define a disk receiving chamber having a diameter substantially identical to that of the disk 78 and characterized by opposed ring-shaped surfaces 84 which are separated by a distance somewhat less than the thickness of the disk 78. By this means the flame arrester disk 78 is securely clamped and sealed between the surfaces 84, thereby eliminating the necessity of providing a gasket between the bells 80 of the intake flame arrester 76.

Intake air flowing from the intake flame arrester 76 is directed through an emergency positive air shutdown valve 86, such as that sold by the A. W. McDonald Co. The valve 86 is manually operable, and upon actuation functions to prevent further air flow into the engine, whereby operation of the engine is immediately terminated. The valve 86 is preferably operated under emergency circumstances only, since it has been found that when the operation of a diesel engine is terminated by preventing air flow into the engine, contaminates tend to accumulate within the cylinders and the exhaust system of the engine. It is then necessary to operate the engine for a considerable period of time following restarting in order to purge the contaminates from the engine and thus return the engine to normal operating conditions. The valve 86 is therefore normally retained in the open condition by means of an easily breakable safety wire.

Intake air flowing from the emergency shut-down valve 86 is directed through an intake manifold 88 and into the cylinders of the diesel engine 20. The manifold 88 is preferably constructed from cast iron in order to withstand the substantially continuous vibration and shock loads which are typically encountered during the operation of a vehicle utilizing an engine incorporating the present invention in a mine or similar environment.

An important feature of the intake system 60 of the diesel engine 20 comprises the fact that the portion of the system extending from the intake flame arrester 76 through the emergency shut-down valve 86 and the intake manifold 88 comprises a conduit 90 formed entirely from solid conduit sections and solid joints therebetween. That is, whereas the conduit 66 may include relatively flexible portions 68, the conduit 90 comprises entirely pipe or similar rigid members and solid connections, i.e., threaded or welded joints, interconnecting the solid sections. This is very important in the practice of the invention in that the conduit 90 and the flame arrester disk 78 function to completely contain any fire or explosion occurring within the intake system and to prevent any sparks or flames generated thereby from escaping to the surrounding atmosphere.

Figure 2:
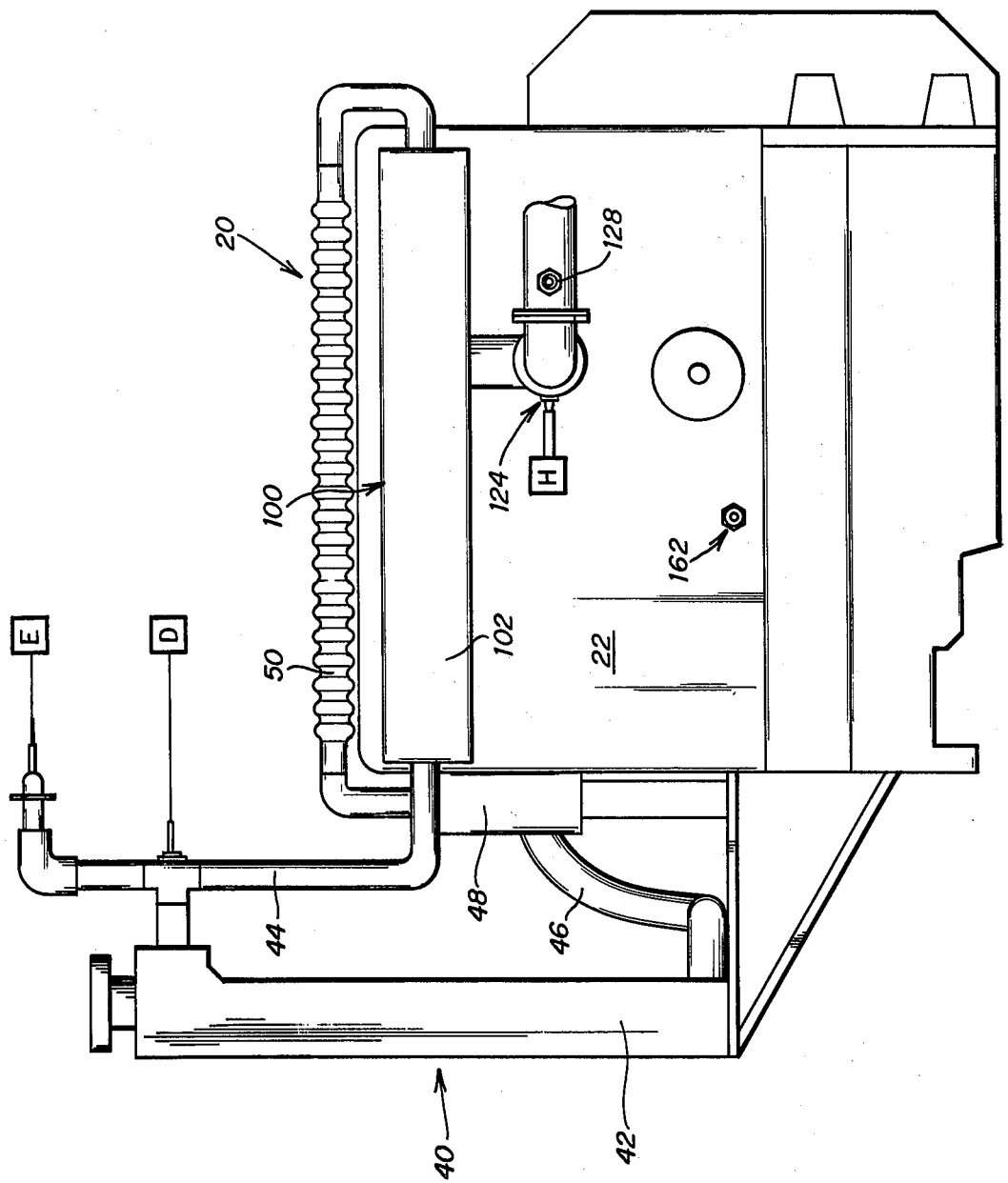
FIG. 2 is a left side view of the engine.
Figure 4:
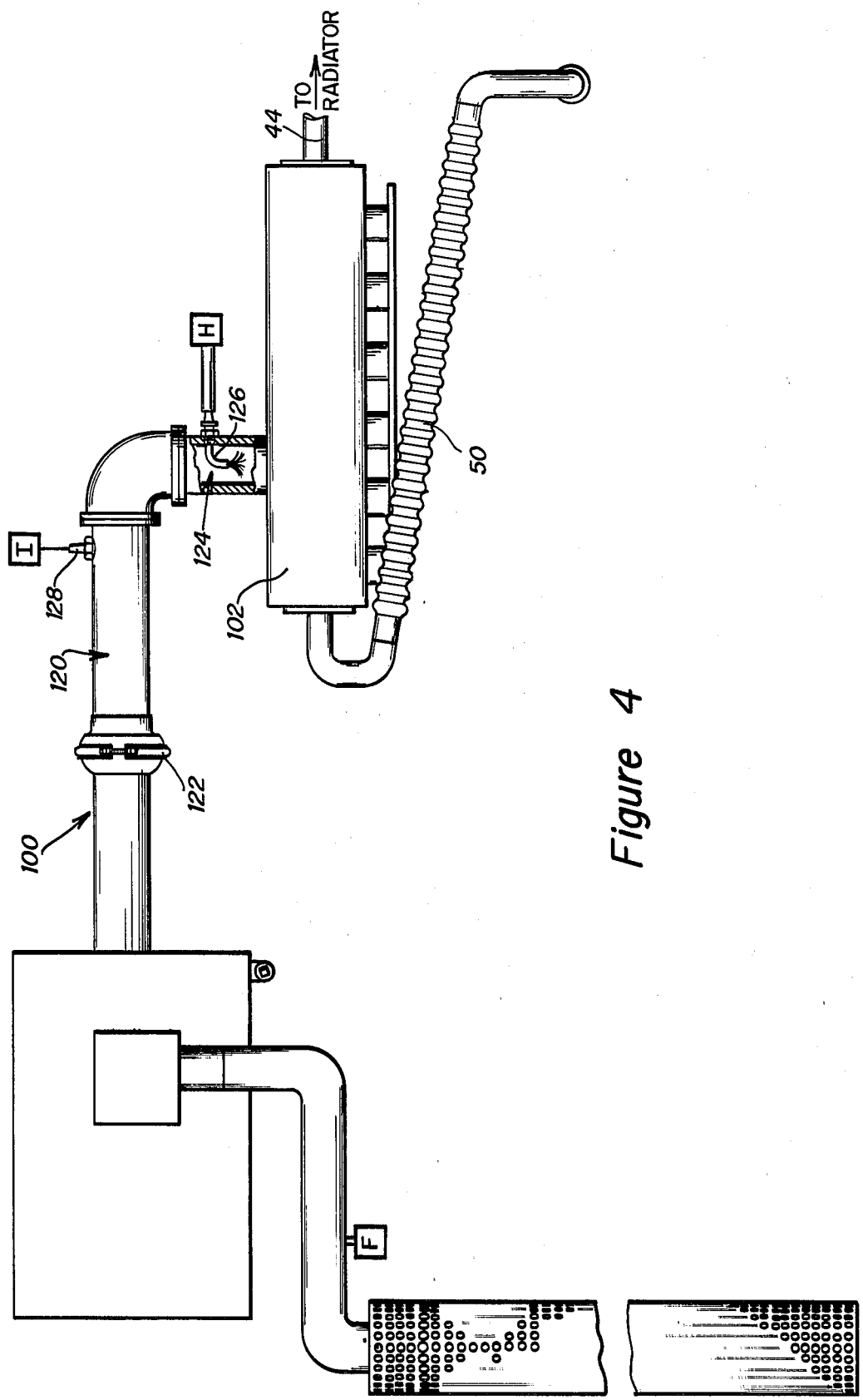
FIG. 4 is an illustration of the exhaust system of the engine in which certain parts have been broken away.

Referring now to FIGS. 2 and 4, the diesel engine 20 further includes an exhaust system 100. The system 100 includes an exhaust manifold 102 which is cooled by means of liquid flowing between the engine block 22 of the engine 20 and the radiator 42 of the cooling system 40. To this end, the exhaust manifold 102 comprises a liquid passageway connected at the one end to the line 50 extending from the engine block 22 and connected at the other end to the line 44 extending to the radiator 42.

Figure 8:
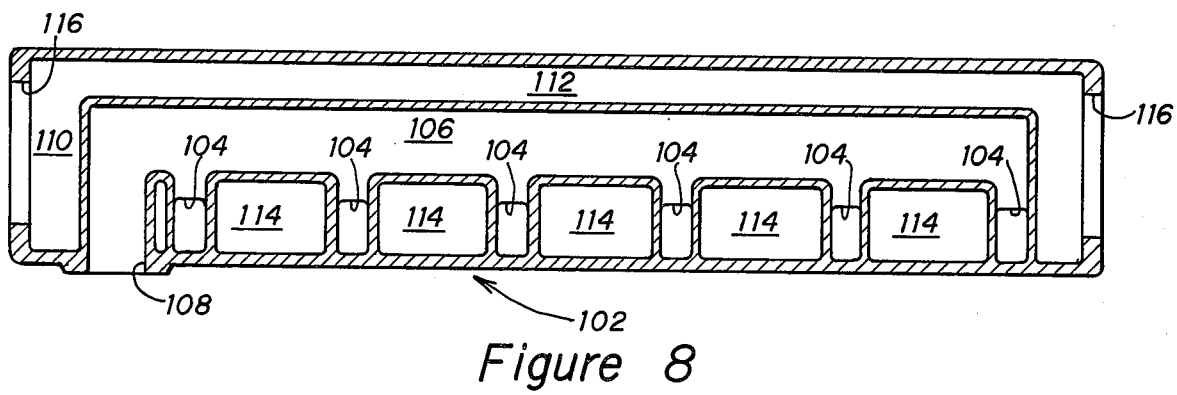
FIG. 8 is a sectional view illustrating the exhaust manifold of the engine.

The construction of the exhaust manifold 102 is further illustrated in FIG. 8. Exhaust gases are received from the cylinders of the engine through a plurality of ports 104. The exhaust gases then flow through a common passageway 106 and an outlet passageway 108. Cooling liquid is directed through a passageway 110 including a portion 112 extending adjacent the passageway 106 and portions 114 extending adjacent the inlet ports 104. By this means the liquid flowing through the exhaust manifold 102 functions to prevent any exposed surface thereof from exceeding a predetermined temperature, typically about 250°, and also functions to provide primary cooling of the exhaust gases flowing from the engine 20.

An important feature of the exhaust manifold 102 comprises a pair of large openings 116 formed at the opposite ends thereof. The exhaust manifold 102 is preferably formed from cast iron, and the openings 116 facilitate the removal of the molds utilized to form the internal passageways of the manifold following the casting operation. Moreover, the openings 116 facilitate the flow of cooling liquid through the liquid passageway 110 of the manifold.

As is best shown in FIG. 4, exhaust gases flowing from the manifold 102 are directed through a conduit 120. The conduit 120 is formed entirely from solid sections and solid connections therebetween, whereby any fire or explosion occurring within the exhaust system 100 is completely contained by the passageway 120. The conduit includes a ball joint 122 which accommodates relative thermal expansion between the component parts of the exhaust system 100.

The exhaust system 100 further comprises a water spray apparatus 124. The apparatus 124 comprises a stainless steel nipple 126 which functions to discharge an umbrella-shaped water spray into the exhaust gases flowing from the manifold 102. The spray is discharged in a direction opposite to the direction of flow of the exhaust gases out of the manifold, and functions to substantially reduce the temperature of the exhaust gases. The shape and direction of the spray are important in assuring cooling of the entire periphery of the conduit 120. It will be understood that such temperature reduction is primarily by means of vaporization of the water spray and entrainment of the resulting water vapor in the exhaust gases.

The exhaust system 100 is provided with a temperature responsive probe 128 extending into the conduit 120. The probe 128 functions by means of the control system of the engine to terminate operation of the engine in the event that the temperature of the exhaust gases flowing from the manifold 102 exceed a predetermined limit, typically about 250° F.

Figure 5:
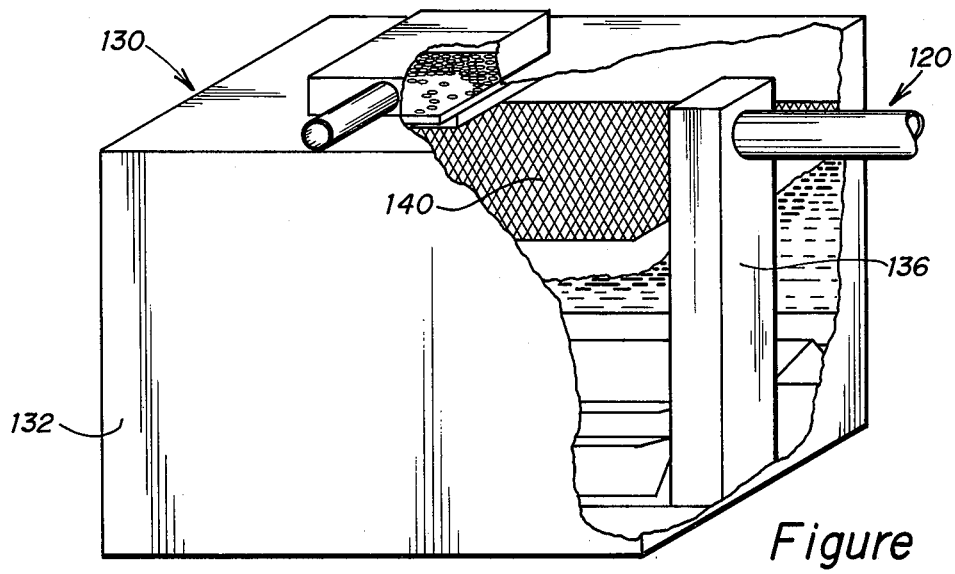
FIG. 5 is a perspective view of the scrubber of the engine in which certain parts have been broken away.
Figure 6:
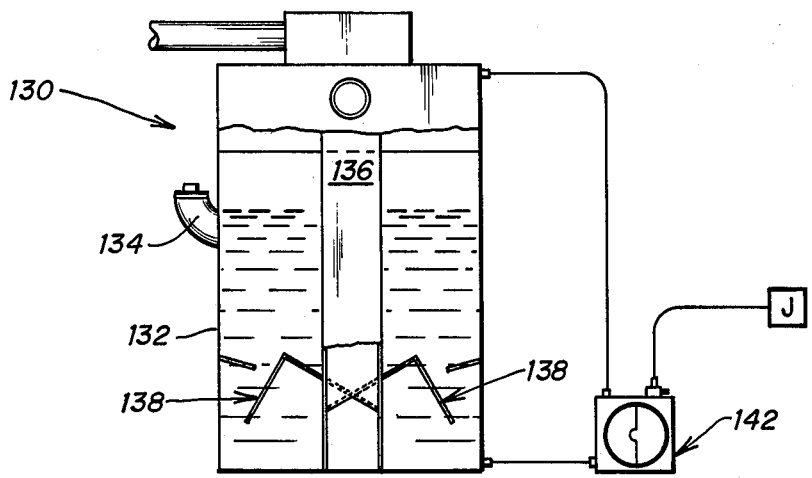
FIG. 6 is an end view of the scrubber.

The exhaust gases flowing through the conduit 120 are directed to a scrubber 130. As is best shown in FIGS. 5 and 6, the scrubber 130 comprises a rectangular enclosure 132 which receives a quantity of water. The enclosure 132 is provided with a filler inlet 134, whereby water is received in the enclosure to a predetermined depth which is generally indicated in FIG. 6.

The scrubber 130 further comprises a downcomer conduit 136 positioned at one end of the enclosure 132. The conduit 136 receives exhaust gases and entrained water vapor directly from the conduit 120 and directs the exhaust gases and the water vapor entrained therein to the bottom of the enclosure 132. From the downcomer conduit 136, the exhaust gases and the entrained water vapor are discharged into a pair of baffle structures 138 each comprising inverted trough-shaped members extending the entire length of the enclosure 132. By this means the exhaust gases and the entrained water vapors are evenly distributed over substantially the entire bottom portion of the enclosure 132.

From the baffle structures 138, the exhaust gases flow upwardly through the water in the enclosure 132. The exhaust gases then pass through a water retainer 140 positioned in the enclosure 132 above the surface of the water therein. The water retainer 140 preferably comprises an expanded metal member formed from stainless steel or the like and extends substantially the entire length and width of the enclosure 132. The water retainer 140 functions to remove entrained water from the exhaust gases flowing upwardly from the surface of the water in the scrubber, whereby the period of time during which the scrubber may be utilized before it is necessary to replenish the supply of water therein is substantially increased.

The scrubber 130 performs a plurality of functions in the operation of the diesel engine 20. First, the scrubber functions to further cool the exhaust gases flowing from the unit. Second, the scrubber 130 functions as an exhaust system flame arrester which cooperates with the conduit 120 to prevent flames or sparks caused by any fire or explosion occurring within the exhaust system from escaping to the atmosphere surrounding the engine. The scrubber 130 also serves as an exhaust gas diluter and functions to remove substantial portions of certain contaminates from the exhaust gas before the exhaust gas is released into the atmosphere surrounding the engine. The contaminates which are removed by the scrubber include aldehydes, oxides of nitrogen, and carbon monoxide.

Referring particularly to FIG. 6, the scrubber 130 further includes a subsystem 142 responsive to the level of the water within the enclosure 132, which may be of the type sold by Kenco under Model Number A1204. It will be appreciated that should the quantity of water in the scrubber fall too low, the scrubber cannot perform its exhaust system flame arrester function. The subsystem 142 therefore functions through the control system of the engine to terminate operation of the engine whenever the scrubber 130 contains an insufficient quantity of water.

Figure 9:
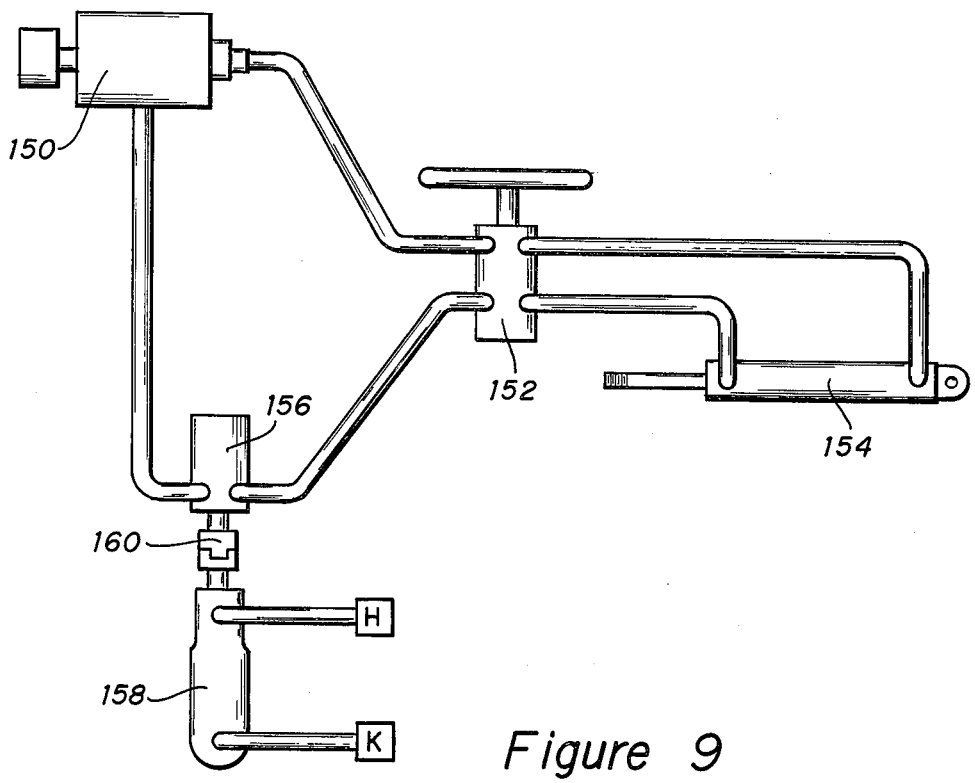
FIG. 9 is an illustration of part of the hydraulic system of a vehicle incorporating the engine.

A portion of the hydraulic system of a vehicle incorporating the engine 20 is illustrated in FIG. 9. The engine drives a hydraulic pump 150 which supplies pressurized hydraulic fluid to a steering control valve 152. The valve 152 in turn controls the operation of a hydraulic cylinder 154 which functions to effect steering of the vehicle.

Pressurized hydraulic fluid from the pump 150 also actuates a hydraulic motor 156. The motor 156 is operatively connected to a water pump 158 by means of a coupling 160. The pump 158 functions to withdraw water from the lower portion of the enclosure 132 of the scrubber 130 and to force the water through the nipple 126 to provide the umbrella spray of the exhaust system 100. It will be appreciated that substantially all of the water that is withdrawn from the enclosure 132 by the pump 158 is returned to the enclosure 132 in the form of water vapor entrained in the exhaust gases, whereby the water spray apparatus 124 of the engine does not substantially deplete the quantity of water in the scrubber 130.

Figure 10:
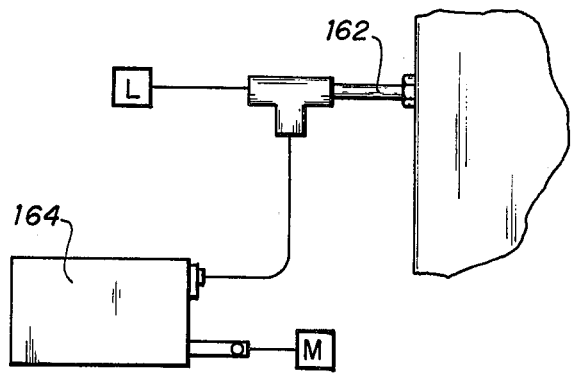
FIG. 10 is an illustration of the oil pressure monitoring system of the engine.

Reffering to FIGS. 2 and 10, the diesel engine 20 is provided with a conventional pressure lubrication system whereby lubricating oil is directed to various component parts of the engine. A probe 162 responsive to the oil pressure of the lubrication system is mounted in the left hand side of the engine block 22. The probe 162 provides dual outputs, one of which functions to actuate a conventional oil pressure gauge. The other output of the probe 162 is directed to an actuator 164 which functions by means of the control system of the engine to terminate operation of the engine in the event of low oil pressure in the lubrication system. The actuator 164 may be of the type sold by Arnot Controls under Model Number 1672 EIA.

Figure 7:
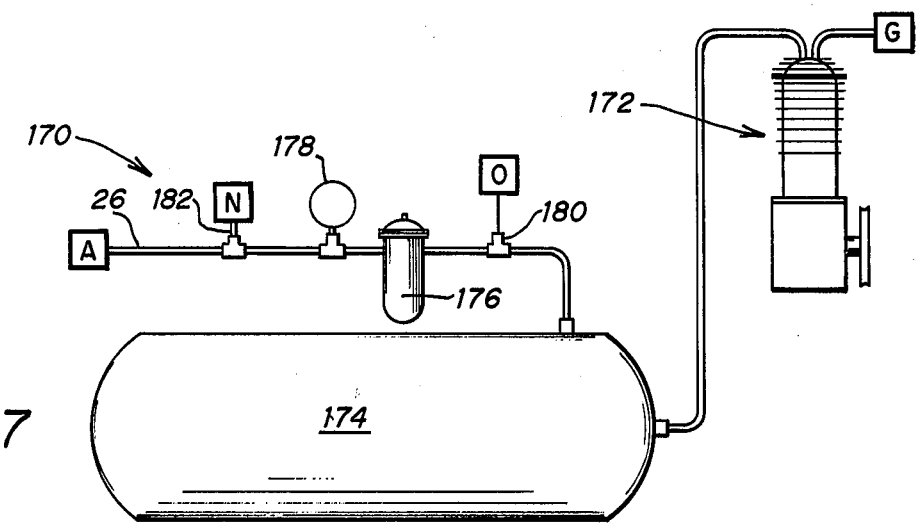
FIG. 7 is an illustration of part of the pneumatic system of the engine.

Referring now to FIG. 7, the diesel engine 20 further includes a pneumatic system 170. The pneumatic system includes a conventional air compressor 172 which is driven by the engine and which functions to maintain a quantity of compressed air within a reservoir 174. The reservoir 174 is in turn connected to the pneumatic starter system 24 of the engine by means of the line 26. The pneumatic system further includes a regulator 176 and an air pressure gauge 178. A top 180 produces an output indicative of the pressure within the system, and a tap 182 is provided for directing compressed air to the control system of the diesel engine.

Figure 11:
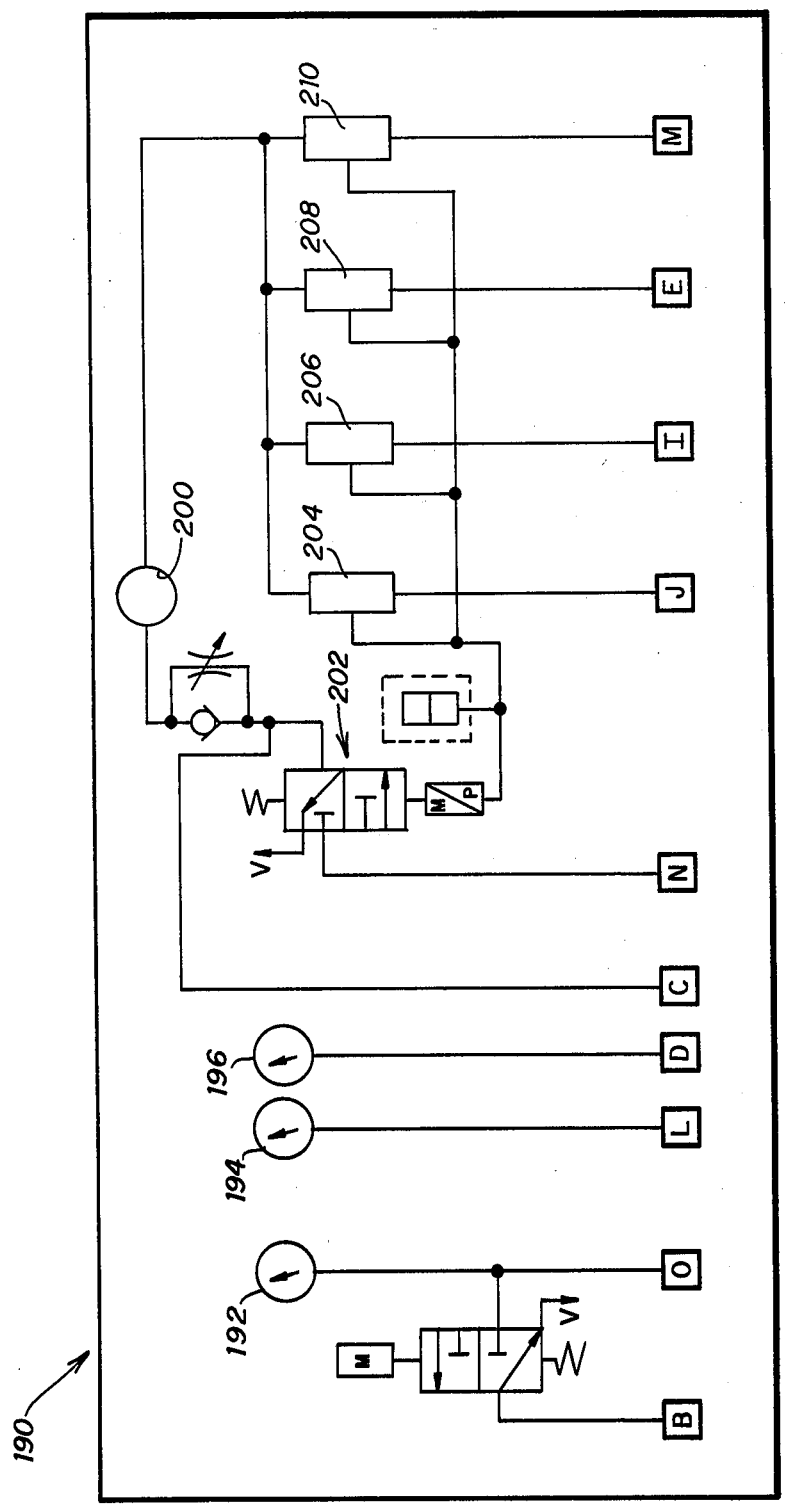
FIG. 11 is an illustration of the control system of the engine.

Referring now to FIG. 11, the diesel engine 20 is provided with a control system 190. The system 190 is substantially entirely pneumatic in operation and is actuated by means of compressed air received from the pneumatic system 170 by means of the tap 182 therein. For example, the control system 190 may be of the type sold by Autocator Controls and identified by that company as Model 410186.

The control system 190 includes three gauges 192, 194, and 196 which indicate the air pressure within the pneumatic system 170, the oil pressure within the lubrication system, and the water temperature within the cooling system 40 of the diesel engine 20. A valve 198 is adapted for manual actuation to actuate the pneumatic starter system 24 of the engine. That is, upon manual actuation of the valve 198, a pilot signal is directed to the valve 28, whereby the valve 28 is actuated to permit compressed air to pass through the line 26 from the reservoir 174 to the pneumatic starter 30. This operation results in rolling of the diesel engine 20.

The control system 190 further includes a reserve compressed air tank 200 and a valve 202. These components normally function to supply compressed air to the slave cylinder 38, whereby the cylinder 38 is maintained in the condition which permits operation of the diesel engine 20. Four valves 204, 206, 208, and 210 are provided, and are responsive to an insufficient quantity of water in the enclosure 132 of the scrubber 130, excessive temperature in the exhaust gases flowing from the exhaust manifold 102, excessive temperature in the liquid flowing in the cooling system 40, and insufficient pressure in the lubrication system of the diesel engine 20, respectively. Upon actuation of any of the valves 204-210, the valve 202 functions to exhaust the slave cylinder 38, whereby the built-in spring bias of the valve 28 immediately operates to shift the valve 38 to the condition wherein operation of the engine 20 is terminated. The valve 202 is also adapted for manual actuation to selectively place the engine 20 in run, stop, or test modes.

From the foregoing, it will be understood that the present invention comprises a diesel engine especially adapted for use in mines and similar potentially flammable and/or potentially inadequately ventilated environments. Diesel engines incorporating the invention include numerous important features which heretofore have not been utilized in apparatus of this type. For example, the intake system of the engine includes an intake flame arrester comprising flame arrester bells having opposed ring-shaped surfaces adapted to securely clamp and seal a flame arrester disk therebetween. This eliminates the necessity of providing a gasket between the flame arrester bells of the intake flame arrester system. Another important feature of the invention comprises the provision in the exhaust system of a ball joint for accommodating relative thermal expansion between the component parts of the system. By this means the exhaust system may comprise a conduit including entirely solid conduit sections and solid joints, whereby any fire or explosion occurring within the exhaust system is completely contained. Still another important feature of the invention comprises the design of the scrubber, whereby the baffles and the water retainer function to substantially extend the period of time during which the scrubber may be utilized before it is necessary to refill the device with water.

Although preferred embodiments of the invention have been illustrated in the accompanying Drawings and described in the foregoing Detailed Description, it will be understood that the invention is not limited to the embodiments disclosed, but is capable of numerous rearrangements, modifications and substitutions of

What is claimed is:

1. A diesel engine for use in mines which comprises:
   an air filter for receiving intake air;
   an intake flame arrester for receiving the air flowing from the air filter and comprising opposed bells adapted to clamp a flame arrester member therebetween;
   an emergency air cut-off valve for receiving the air flowing from the intake flame arrester and adapted for selective manual actuation to terminate air flow into the engine;
   an intake manifold for receiving the air flowing through the air filter, the intake flame arrester, and the emergency air cut-off valve and for directing the air to the cylinders of the engine;
   an exhaust manifold for receiving exhaust gases from the cylinders of the engine;
   means for directing cooling liquid through the exhaust manifold and thereby partially cooling the exhaust gases passing therethrough;
   means for spraying water into the exhaust gases flowing from the exhaust manifold and thereby further cooling the exhaust gases by means of vaporization of the water spray;
   a scrubber for receiving the exhaust gases flowing from the exhaust manifold and water vapor entrained therein, said scrubber comprising:
   an enclosure for receiving a substantial quantity of water;
   means for directing the exhaust gases and the water vapor entrained therein to a point beneath the surface of the water in the enclosure;
   baffle means comprising inverted trough-shaped baffle members extending the length of the enclosure and mounted beneath the surface of the water in the enclosure for distributing the exhaust gases and the water vapor entrained therein beneath the surface of the water in the enclosure; and
   water retainer means mounted within the enclosure above the surface of the water and comprising an expanded metal member extending substantially parallel to the bottom of the enclosure and throughout the entire length and width of the enclosure and throughout the entire length and width of the enclosure for removing entrained water vapor from the exhaust gases flowing from the scrubber, and
   exhaust gas diffuser means comprising a horizontally disposed conduit having outlet holes formed through it at a plurality of axially spaced points for receiving the exhaust gases flowing from the scrubber and for discharging the exhaust gases to the surrounding atmosphere.

2. The diesel engine according to claim 1 wherein the intake flame arrester is further characterized by:
   a disk-shaped flame arrester member having a predetermined diameter and a predetermined thickness; and
   opposed disk-shaped cavities formed in the flame arrester bells for cooperation to define a flame arrester disk receiving chamber characterized by a diameter substantially identical to that of the flame arrester disk and opposed ring-shaped surfaces separated by a distance somewhat less than the thickness of the flame arrester disk,
   whereby the flame arrester disk is securely clamped between the ring-shaped surfaces of the flame arrester receiving cavities of the bells to seal the interior of the bells without the necessity of positioning a gasket between the bells.

3. The diesel engine according to claim 2 further characterized by conduit means extending from the air cleaner to the intake flame arrester, from the intake flame arrester to the emergency air cut-off valve, and from the emergency air cut-off valve to the intake manifold and including entirely solid connections interconnecting the intake flame arrester, the emergency air cut-off valve, and the intake manifold such that any fire or explosion occurring within the conduit means is completely contained by the solid connections and the intake flame arrester.

4. The diesel engine according to claim 1 wherein the exhaust manifold is further characterized by a cast structure defining separate exhaust water passageways and enlarged end openings which facilitate the removal of mold members following the casting operation.

5. The diesel engine according to claim 1 further characterized by conduit means extending between the exhaust manifold and the scrubber and comprising entirely solid connections whereby any fire or explosion occurring within the exhaust system is entirely contained by the conduit means and the scrubber, said conduit means further including a ball joint for accommodating relative thermal expansions between the component parts of the exhaust system.

6. The diesel engine according to claim 1 wherein the water spraying means further comprises:
   means for pumping water from the scrubber to a point adjacent the outlet of the exhaust manifold; and
   means for discharging the water spray in a direction opposite to the direction of flow of the exhaust gases out of the exhaust manifold and in the form of an umbrella-shaped spray.

7. The diesel engine according to Claim 1 wherein the scrubber is further characterized by:
   a generally rectangular enclosure for receiving water to a predetermined depth;
   downcomer conduit means extending along one end of the rectangular enclosure for discharging exhaust gases at a point substantially beneath the surface of the water in the enclosure;
   said baffle means extending substantially parallel to the bottom of the enclosure for receiving exhaust gases from the downcomer conduit means and for discharging the exhaust gases into the water in the enclosure; and
   exhaust gas outlet means formed at the top of the enclosure.

8. In a diesel engine of the type including an engine block defining a plurality of cylinders, a plurality of pistons each mounted for reciprocation in one of the cylinders to effect combustion of an air/fuel mixture received therein, and means for directing liquid through the engine block and thereby cooling the engine, the improvement comprising:
   an intake flame arrester for receiving intake air and comprising opposed bells adapted to clamp a flame arrester member therebetween;

an emergency air cut-off valve for receiving intake air flowing from the intake flame arrester and adapted for selective manual actuation to terminate air flow into the engine;

an intake manifold for receiving intake air flowing through the emergency air cut-off valve and for directing the intake air into the cylinders of the engine;

conduit means interconnecting the intake flame arrester, the emergency air cut-off valve and the intake manifold, and comprised entirely of solid conduit sections and solid connections therebetween, whereby any fire or explosion occurring within the conduit means is entirely contained thereby;

an exhaust manifold for receiving exhaust gases flowing from the cylinders of the engine;

means for directing cooling liquid flowing from the engine block through the exhaust manifold and thereby partially cooling the exhaust gases;

means for discharging a water spray into the exhaust gases flowing from the exhaust manifold and thereby further cooling the exhaust gases;

a scrubber for receiving the exhaust gases flowing from the exhaust manifold and the water vapor entrained therein and comprising:

an enclosure for receiving a substantial quantity of water;

means for discharging the exhaust gases and the water vapor entrained therein at a point beneath the surface of the water in the enclosure;

baffle means comprising inverted trough-shaped members extending substantially parallel to the bottom of the enclosure for receiving exhaust gases from the discharging means and for discharging the exhaust gases into the water in the enclosure; and water retainer means mounted within the enclosure above the surface of the water and comprising an expanded metal member extending substantially parallel to the bottom of the enclosure and throughout the entire length and width of the enclosure for removing entrained water vapor from the exhaust gases flowing from the scrubber.

9. The engine according to claim 8 further including a pneumatic starter and an air compressor driven by the engine for generating compressed air to actuate the pneumatic starter.

10. The diesel engine according to claim 8 further characterized by means responsive to an excessive temperature in the cooling water flow through the engine block and the exhaust manifold, or to excessive temperature in the exhaust gas flowing from the exhaust manifold, or an insufficient quantity of water in the scrubber, or insufficient pressure in the lubrication system of the engine for immediately terminating operation of the engine.

11. The diesel engine according to claim 8 wherein the opposed bells of the intake flame arrester are further characterized by opposed surfaces for clamping engagement with the intake flame arrester member, thereby forming a seal in the intake flame arrester and eliminating the necessity of the use of a gasket between the opposed bells thereof.

12. The diesel engine according to claim 8 further characterized by conduit means interconnecting the exhaust manifold and the scrubber which comprises solid conduit sections and solid joints therebetween whereby any fire or explosion occurring within the conduit means is entirely contained thereby, and further including a ball joint in the conduit means for accommodating thermal expansion.

* * * * *